United States Patent
Ohishi et al.

(10) Patent No.: US 10,717,483 B2
(45) Date of Patent: Jul. 21, 2020

(54) LUG BAR, TRACK SHOE, AND METHOD FOR PRODUCING LUG BAR

(71) Applicant: KOMATSU LTD., Tokyo (JP)

(72) Inventors: Masayuki Ohishi, Hirakata (JP); Hisao Asada, Kyotanabe (JP); Tomoyoshi Sho, Kyotanabe (JP); Kenichi Hisamatsu, Hirakata (JP)

(73) Assignee: KOMATSU LTD., Tokyo (JP)

( * ) Notice: Subject to any disclaimer, the term of this patent is extended or adjusted under 35 U.S.C. 154(b) by 200 days.

(21) Appl. No.: 15/574,129

(22) PCT Filed: Jun. 26, 2015

(86) PCT No.: PCT/JP2015/068579
§ 371 (c)(1),
(2) Date: Nov. 14, 2017

(87) PCT Pub. No.: WO2016/208082
PCT Pub. Date: Dec. 29, 2016

(65) Prior Publication Data
US 2018/0127036 A1    May 10, 2018

(51) Int. Cl.
*B62D 55/26* (2006.01)
*B23K 9/04* (2006.01)
(Continued)

(52) U.S. Cl.
CPC .............. *B62D 55/26* (2013.01); *B23K 9/04* (2013.01); *B62D 55/28* (2013.01);
(Continued)

(58) Field of Classification Search
CPC .......... B62D 55/26; B62D 55/28; B23K 9/04; B23K 9/042; B23K 9/044; B23K 9/0206
See application file for complete search history.

(56) References Cited

U.S. PATENT DOCUMENTS 2,874,005 A * 2/1959 Engstrom .............. B62D 55/28
305/192
3,071,490 A * 1/1963 Pevar ........................ C23C 4/02
427/540

(Continued)

FOREIGN PATENT DOCUMENTS

CN    201729200 U    2/2011
CN    203094215 U    7/2013
(Continued)

OTHER PUBLICATIONS

Machine translation of JP 2013046928, 16 pages (Year: 2013).*
Jul. 21, 2015 International Search Report issued in International Patent Application No. PCT/JP2015/068579.

*Primary Examiner* — Jason R Bellinger
(74) *Attorney, Agent, or Firm* — Oliff PLC

(57) ABSTRACT

The lug bar includes a base, having a bar shape and made of a first metal, and an overlay, extending along the longitudinal direction of the base to cover a covered region as a part of the outer peripheral surface of the base. In an overlay edge portion corresponding to a boundary between the covered region and an exposed region other than the covered region of the surface of the base, the exposed region and the surface of the overlay are flush with each other to form a forged surface.

11 Claims, 11 Drawing Sheets

(51) Int. Cl.
  *B62D 55/28* (2006.01)
  *B62D 55/215* (2006.01)
  *B62D 55/32* (2006.01)

(52) U.S. Cl.
  CPC ......... *B60Y 2200/25* (2013.01); *B62D 55/215* (2013.01); *B62D 55/32* (2013.01)

(56) References Cited

U.S. PATENT DOCUMENTS

| | | | |
|---|---|---|---|
| 3,912,338 A | 10/1975 | Toews | |
| 4,021,082 A | 5/1977 | Rasmussen | |
| 4,097,711 A * | 6/1978 | Banerjee | B23K 9/04 |
| | | | 219/76.1 |
| 4,243,727 A * | 1/1981 | Wisler | C23C 4/06 |
| | | | 175/374 |
| 5,944,395 A | 8/1999 | Neubert et al. | |
| 6,414,258 B1 * | 7/2002 | Amano | B23K 9/046 |
| | | | 219/76.14 |
| 8,424,980 B2 * | 4/2013 | Fischer | B62D 55/26 |
| | | | 305/179 |
| 2009/0019783 A1 * | 1/2009 | Amano | B23K 9/04 |
| | | | 51/309 |
| 2012/0156520 A1 * | 6/2012 | Meyer | B23K 9/042 |
| | | | 428/684 |

FOREIGN PATENT DOCUMENTS

| | | | | |
|---|---|---|---|---|
| JP | S56-157602 A | 12/1981 | | |
| JP | H11-1188 A | 1/1999 | | |
| JP | 2004-058688 A | 2/2004 | | |
| JP | 2013046928 | * | 3/2013 | ............... B23K 9/04 |

* cited by examiner

FIG.15
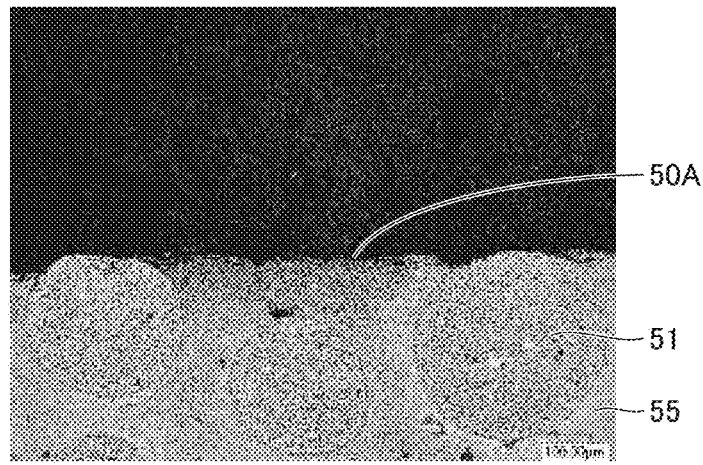
FIG.16     <COMPARATIVE EXAMPLE>
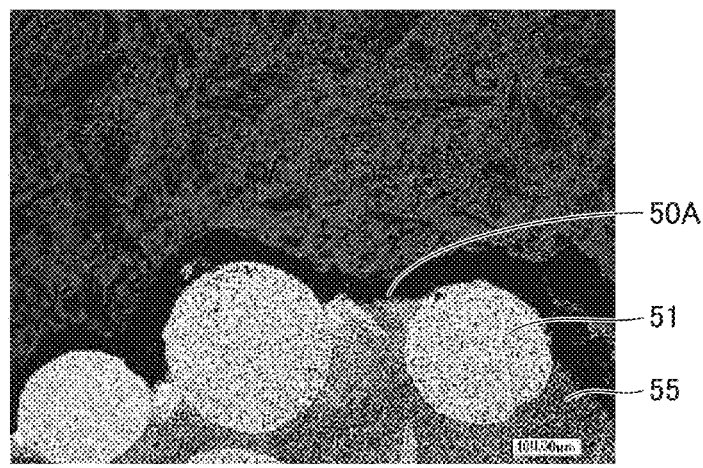
FIG.17
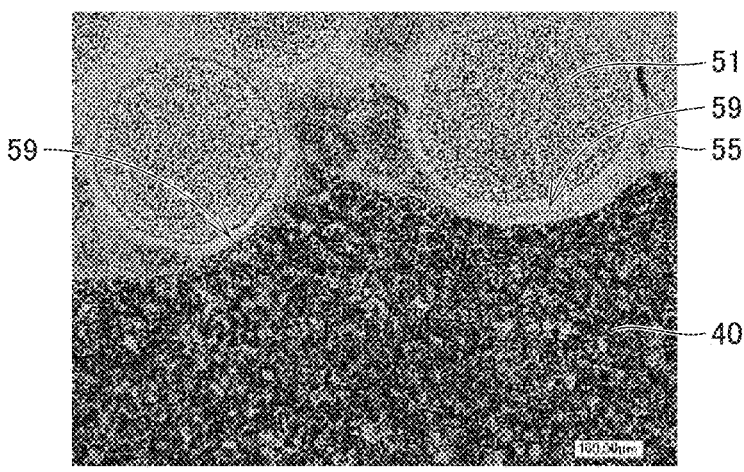

LUG BAR, TRACK SHOE, AND METHOD FOR PRODUCING LUG BAR

TECHNICAL FIELD

The present invention relates to a lug bar, a track shoe, and a method for producing a lug bar.

BACKGROUND ART

Hydraulic excavators, bulldozers, and other work machines are equipped with a track travel device. A track constituting the track travel device includes a plurality of track links, which are connected endlessly, and track shoes, which are fixed to the corresponding track links. Each track shoe includes a plate portion having a plate shape, and a grouser portion protruding from the plate portion. During traveling with the track travel device, the track rotates while the grouser portions of the track shoes are engaging the ground. This causes the grouser portions to wear out earlier than the plate portions. Advanced wear of the grouser portions will adversely affect the traveling with the track travel device, so the track shoes are replaced, for example.

However, it is often the case that even when a grouser portion has worn out, the corresponding plate portion is still usable. In such a case, replacing the track shoe as a whole is not cost-effective. Thus, the track shoe with its grouser portion worn out may be subjected to repair, in which a lug bar having a similar shape as the original grouser portion is placed on that track shoe by welding or other means (see, for example, Japanese Patent Application Laid-Open No. 2004-58688 (Patent Literature 1)).

CITATION LIST

Patent Literature

Patent Literature 1: Japanese Patent Application Laid-Open No. 2004-58688

SUMMARY OF INVENTION

Technical Problem

The track shoe thus repaired becomes usable again. However, if such repairs are frequently required for the track shoes, downtime of the work machine caused by the repairs will become long. The lug bar is therefore desired to have improved durability.

An object of the present invention is to provide a lug bar improved in durability and a track shoe including the lug bar.

Solution to Problem

A lug bar according to the present invention is a component to be joined to a grouser portion of a track shoe constituting a track. The lug bar includes: a base having a bar shape and made of a first metal; and an overlay extending along a longitudinal direction of the base to cover a covered region as a part of an outer peripheral surface of the base. In an overlay edge portion corresponding to a boundary between the covered region and an exposed region other than the covered region of the surface of the base, the exposed region and a surface of the overlay are flush with each other to form a forged surface.

Forming an overlay having higher wear resistance than the base in the lug bar can improve the durability (wear resistance) of the lug bar. The overlay can be formed on the surface of the base by overlaying welding or other techniques. In such a wear-resistant component having an overlay formed, in an overlay edge portion corresponding to the boundary between a region (covered region) covered with the overlay and a region (exposed region) other than the covered region of the surface of the base, a step is usually formed between the surface of the overlay and the exposed region of the base. During the operation of the track travel device, stress will be concentrated on this step, which may lead to degradation in durability of the lug bar.

In the lug bar of the present invention, in the overlay edge portion, the exposed region of the base and the surface of the overlay are flush with each other. This can prevent the degradation in durability of the lug bar otherwise caused by the step described above. As such, according to the lug bar of the present invention, it is possible to provide a lug bar improved in durability.

In the lug bar described above, the overlay may include a matrix made of a second metal, and hard particles dispersed in the matrix. This facilitates formation of an overlay excellent in wear resistance.

In the lug bar described above, the hard particles located in an overlay surface region, which is a region within an average particle diameter of the hard particles from the surface of the overlay, may be arranged side by side while being embedded in the overlay. This prevents the hard particles from being arranged protruding noticeably from the surface of the overlay. As a result, the hard particles are prevented from falling off during the use of the lug bar. It should be noted that the average particle diameter of the hard particles may be obtained by observing a cross section perpendicular to the surface of the overlay with an optical microscope, and by calculating an average of the diameters of ten hard particles observed.

In the lug bar described above, the hard particles located in the overlay surface region may be arranged in contact with the surface of the overlay. With this, the region of a hard particle exposed from the surface of the overlay becomes small, which prevents the hard particle from falling off.

In the lug bar described above, among the hard particles located in the overlay surface region, any hard particle having a region exposed from the surface of the overlay may have an acute central angle (of less than 90°) corresponding to the region exposed from the surface of the overlay. With this, the region of a hard particle exposed from the surface of the overlay becomes small, which prevents the hard particle from falling off.

In the lug bar described above, in a region including an interface between the overlay and the base, the overlay may include a plurality of protrusions that protrude toward the base. Each protrusion may have at least a part of a hard particle received therein. This prevents the overlay from coming off the base.

A track shoe according to the present invention includes the above-described lug bar of the present invention. According to the track shoe of the present invention, it is possible to provide a track shoe excellent in durability, by virtue of the lug bar of the present invention included therein. The track shoe of the present invention includes, for example, a plate portion having a plate shape, a grouser portion that protrudes from the plate portion, and a lug bar connected to the grouser portion. The lug bar is the above-described lug bar of the present invention.

A method for producing a lug bar according to the present invention is a method for producing a lug bar to be joined to a grouser portion of a track shoe constituting a track. This lug bar producing method includes the steps of: preparing a base member having a bar shape and made of a first metal; forming an overlay to extend along a longitudinal direction of the base member to cover a covered region as a part of a surface of the base member; and forging the base member having the overlay formed, such that an overlay edge portion corresponding to a boundary between the covered region and an exposed region other than the covered region of the surface of the base member is worked.

In the method for producing a lug bar of the present invention, the base member having the overlay formed is forged such that the overlay edge portion is worked. This produces a lug bar having an overlay edge portion in which the surface of the overlay and the exposed region of the base are flush with each other to form a forged surface. As a result, degradation in durability of the lug bar otherwise caused by the step described above is prevented, and it is thus possible to provide a lug bar improved in durability.

In the lug bar producing method described above, the step of forging the base member having the overlay formed may include hot forging the base member having the overlay formed. Hot forging adopted can facilitate forging of the base member with the overlay formed.

In the lug bar producing method described above, the step of forging the base member having the overlay formed may include heating the overlay and the base member as a whole for hot forging.

In the process of forming an overlay on the base member, as the base member is partially heated, the lug bar may suffer distortion. Particularly, when an overlay is formed along the longitudinal direction of the bar-shaped base member, the lug bar of the bar shape may be warped into an arc shape. Heating the entirety of the overlay and base member for hot forging prevents such distortion.

In the lug bar producing method described above, the step of forming the overlay may include forming the overlay including a matrix made of a second metal and hard particles dispersed in the matrix. This facilitates formation of an overlay excellent in wear resistance.

Effects of Invention

As is clear from the above description, according to the lug bar, the track shoe, and the lug bar producing method of the present invention, it is possible to provide a lug bar and a track shoe both improved in durability.

BRIEF DESCRIPTION OF DRAWINGS

FIG. 15 is an optical micrograph showing a surface and its vicinity of an overlay (Example);

FIG. 16 is an optical micrograph showing a surface and its vicinity of an overlay (Comparative example);

FIG. 17 is an optical micrograph showing an interface between an overlay and a base and its vicinity (Example)

DESCRIPTION OF EMBODIMENT

Figure 1:
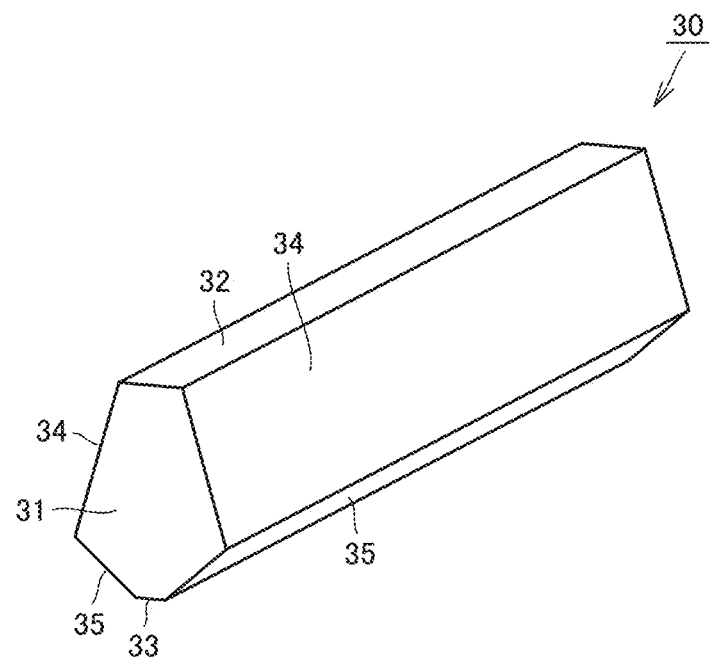
FIG. 1 is a schematic perspective view showing the structure of a lug bar.

An embodiment of the present invention will be described below. In the following drawings, the same or corresponding parts are denoted by the same reference numerals, and the description thereof will not be repeated.

Figure 2:
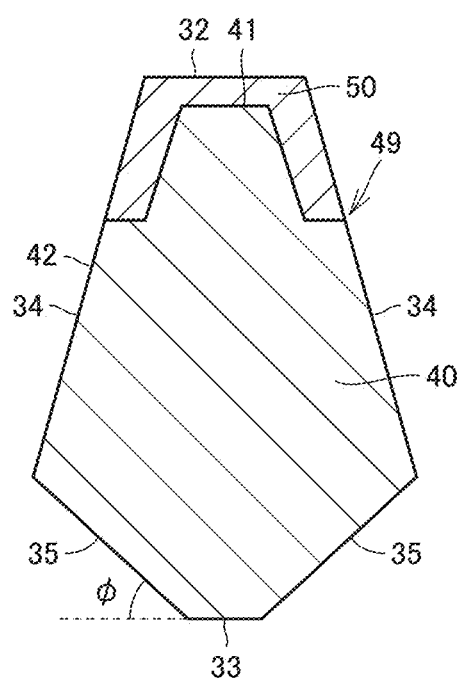
FIG. 2 is a schematic cross-sectional view showing a cross section of the lug bar perpendicular to the longitudinal direction thereof.

FIG. 1 is a schematic perspective view showing the structure of a lug bar. FIG. 2 is a schematic cross-sectional view showing a cross section of the lug bar perpendicular to the longitudinal direction thereof.

Referring to FIG. 1, a lug bar 30 is used, when a grouser portion of a track shoe constituting a track wears out, for repairing the track shoe, with the lug bar being joined to the grouser portion. The lug bar 30 has a bar shape. The lug bar 30 has a pair of end surfaces 31 of a hexagonal shape, and an outer peripheral surface connecting the pair of end surfaces 31. The outer peripheral surface includes a joint surface 33, a pair of first side surfaces 35, a pair of second side surfaces 34, and a tip end surface 32.

The joint surface 33, the first side surfaces 35, the second side surfaces 34, and the tip end surface 32 each have a rectangular shape. The joint surface 33, the first side surfaces 35, the second side surfaces 34, and the tip end surface 32 are each orthogonal to the pair of end surfaces 31. The lug bar 30 has a hexagonal column shape.

The joint surface 33 is a surface to be joined to the grouser portion at the time of repairing a track shoe. The first side surfaces 35 are located on the respective sides of the joint surface 33 in the circumferential direction of the lug bar 30. The second side surfaces 34 are each located on a side of the corresponding first side surface 35 opposite to the joint surface 33 side in the circumferential direction of the lug bar 30. The tip end surface 32 is arranged to connect the pair of second side surfaces 34. A virtual plane including the joint surface 33 makes an angle $\phi$ with a first side surface 35. The angle $\phi$ defines a groove angle at the time of welding the lug bar 30 to a worn track. The angle $\phi$ can be set to an appropriate angle, depending on the structure of the track and the like; it may be set to about 45°, for example.

Referring to FIGS. 1 and 2, the lug bar 30 includes a base 40, which has a bar shape and is made of a first metal, and an overlay 50, which extends along the longitudinal direction of the base 40 to cover a covered region 41 that is a part of an outer peripheral surface of the base 40. In an overlay edge portion 49 corresponding to a boundary between the covered region 41 and an exposed region 42 that is a region other than the covered region 41 of the surface of the base 40, the exposed region 42 and a surface of the overlay 50 are flush with each other to form a forged surface. The overlay 50 is formed to cover the entirety in the circumferential direction of the tip end surface 32, and also partially cover the second side surfaces 34. The overlay 50 is formed over the entire length in the longitudinal direction of the base 40.

As the first metal for the base 40, for example, carbon steel for machine structural use or alloy steel for machine structural use specified in JIS standard (for example, S45C or SCM435, as well as manganese steel (SMn), chromium steel (SCr), or chromium-molybdenum steel (SCM) containing an equivalent amount of carbon) can be adopted. The surface of the overlay 50 is entirely the forged surface.

Referring to FIGS. 1 and 2, according to the lug bar 30 in the present embodiment, the exposed region 42 and the surface of the overlay 50 are flush with each other in the overlay edge portion 49. This prevents degradation in durability of the lug bar 30 otherwise caused by a step in the overlay edge portion 49. With the overlay edge portion 49 included in the forged surface, the working step such as cutting for making the exposed region 42 and the surface of the overlay 50 flush with each other can be omitted. Consequently, the working on the overlay edge portion 49 where the difference in hardness is great and the working on the overlay 50 which is high in hardness can be avoided. As such, the lug bar 30 in the present embodiment has high durability.

Figure 3:
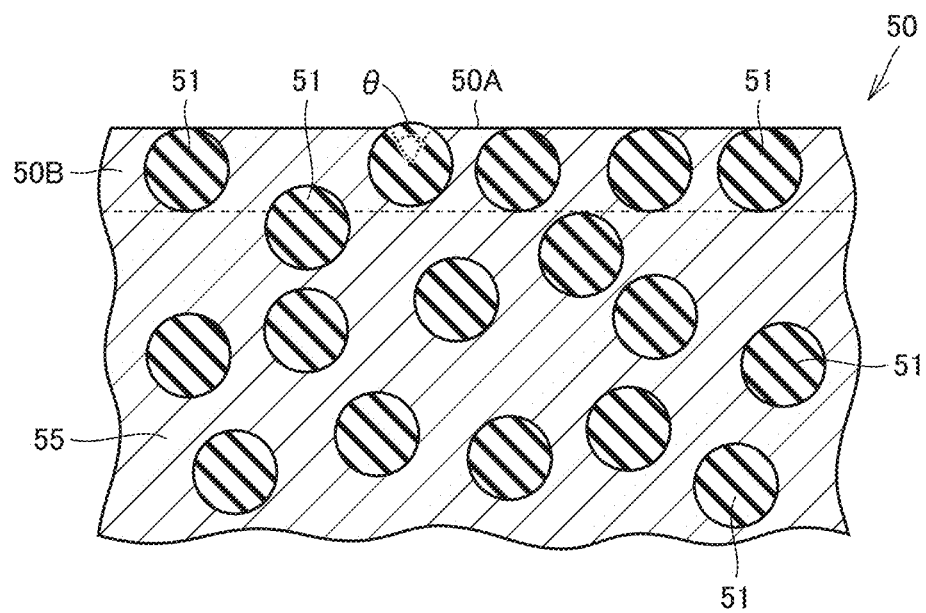
FIG. 3 is a schematic cross-sectional view showing the structure of an overlay at and near its surface.
Figure 4:
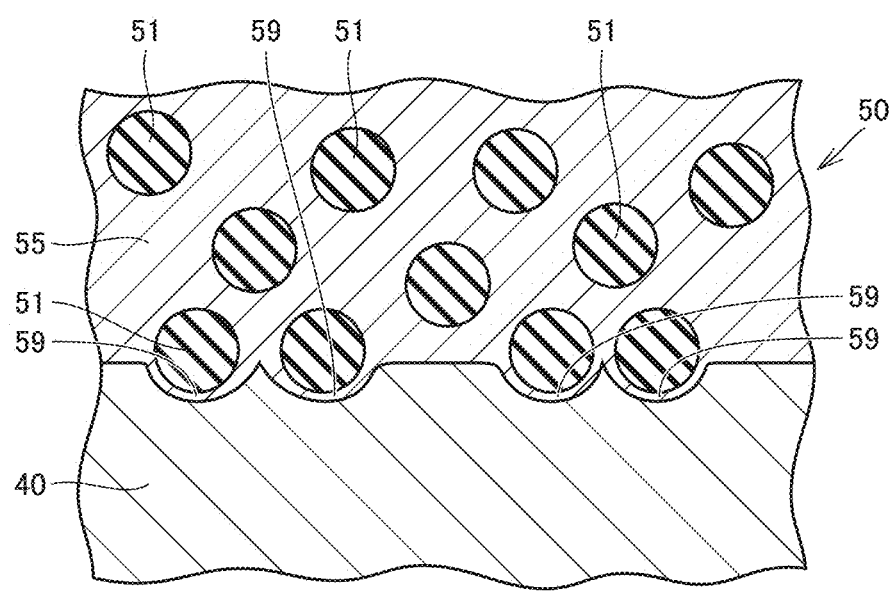
FIG. 4 is a schematic cross-sectional view showing the structure at and around an interface between the overlay and a base.

A description will now be made about the structure of an overlay 50. FIG. 3 is a schematic cross-sectional view showing the structure of an overlay at and near its surface. FIG. 4 is a schematic cross-sectional view showing the structure at and around an interface between the overlay and a base. Referring to FIGS. 3 and 4, the overlay 50 includes a matrix 55 made of a second metal, and hard particles 51 dispersed in the matrix 55. The second metal forming the matrix 55 can be, for example, a mixture of a metal derived from a welding wire and the first metal forming the base 40. As the hard particles 51, particles having higher hardness than the matrix 55, for example particles of cemented carbide, can be adopted. The overlay 50 has higher wear resistance (sand abrasion resistance) than the base 40.

Referring to FIG. 3, the overlay 50 has a surface 50A which is a forged surface. The hard particles 51 located in an overlay surface region 50B, which is a region within an average particle diameter of the hard particles 51 from the surface 50A of the overlay 50, are arranged side by side while being embedded in the overlay 50. This prevents the hard particles 51 from being arranged protruding noticeably from the surface 50A of the overlay 50. This consequently prevents the hard particles 51 from falling off during the use of the lug bar 30, leading to improved wear resistance of the lug bar 30.

The hard particles 51 located in the overlay surface region 50B may be arranged in contact with the surface 50A of the overlay 50, as shown in FIG. 3. With this, the region of a hard particle 51 exposed from the surface 50A of the overlay 50 becomes small, which prevents the hard particle 51 from falling off.

A hard particle 51 having a region exposed from the surface 50A of the overlay 50 preferably has an acute central angle θ (of less than 90°) corresponding to that exposed region. With this, the region of a hard particle 51 exposed from the surface 50A of the overlay 50 becomes small, which prevents the hard particle 51 from falling off.

Referring to FIG. 4, in a region including the interface between the overlay 50 and the base 40, the overlay 50 includes a plurality of protrusions 59 that protrude toward the base 40. The protrusions 59 provide an anchor effect to prevent the overlay 50 from coming off the base 40. A protrusion 59 receives at least a part of a hard particle 51. This more reliably prevents the overlay 50 from coming off the base 40. There exists the matrix 55 of the overlay 50 between the base 40 and the hard particle 51 received in the protrusion 59. The hard particle 51 received in the protrusion 59 is not in contact with the base 40. The hard particle 51 has its center located outside the protrusion 59 (i.e., a part of the hard particle 51 having a volume less than a half thereof is received in the protrusion 59). One hard particle 51 is received in one protrusion 59. Each protrusion 59 has a depth that is smaller than the radius of the hard particle 51 received in the protrusion 59.

Figure 5:
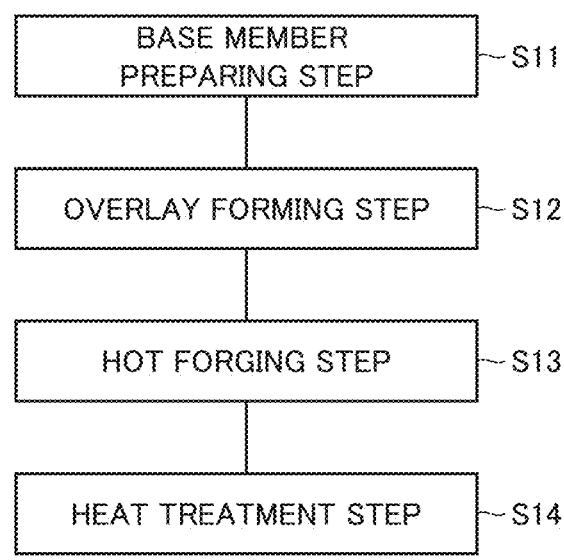
FIG. 5 is a flowchart schematically illustrating a method for producing a lug bar.
Figure 6:
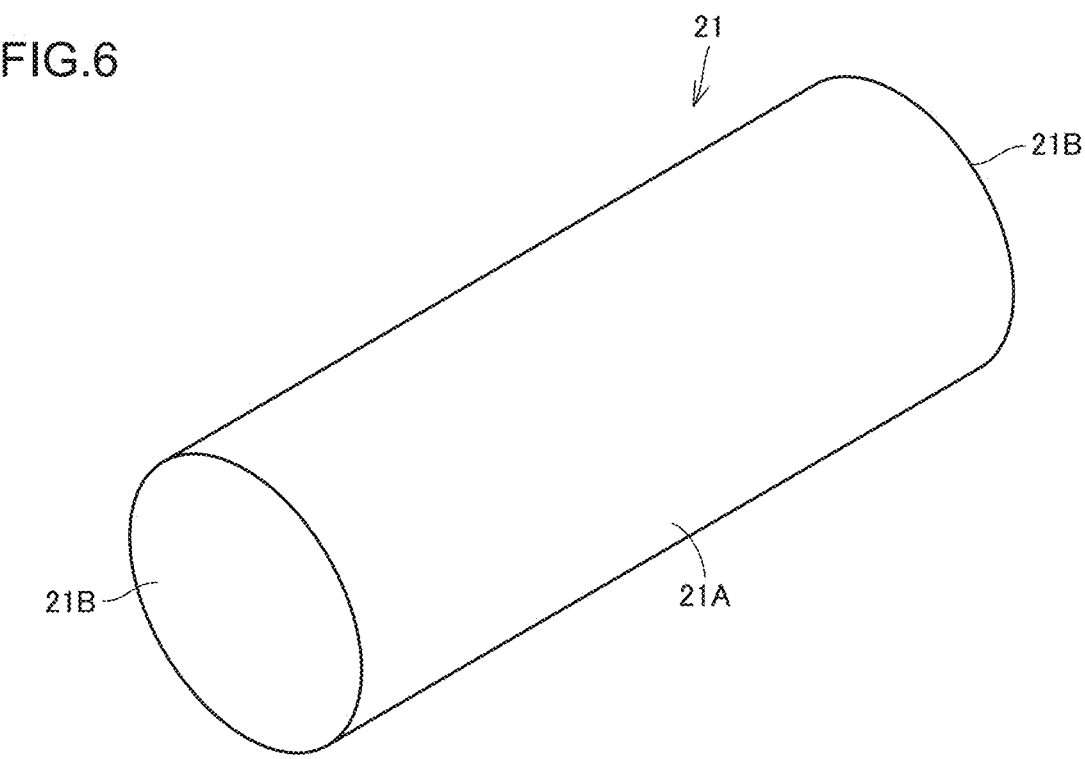
FIG. 6 is a schematic perspective view illustrating the lug bar producing method.
Figure 7:
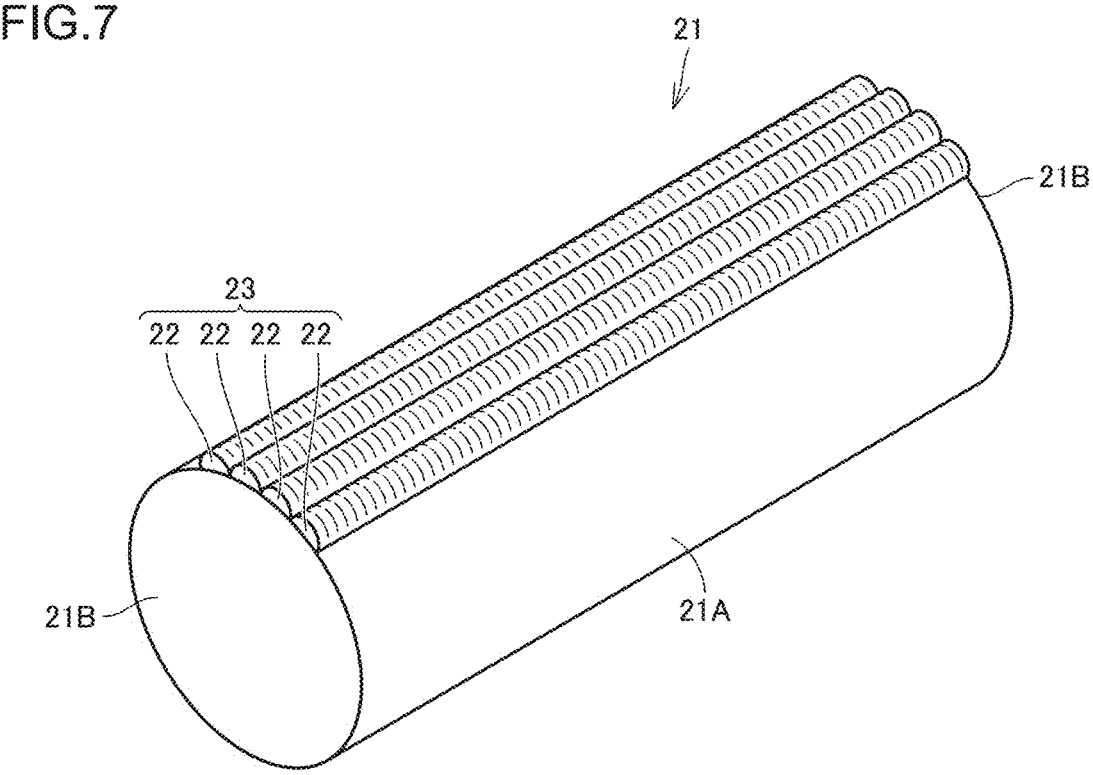
FIG. 7 is another schematic perspective view illustrating the lug bar producing method.
Figure 8:
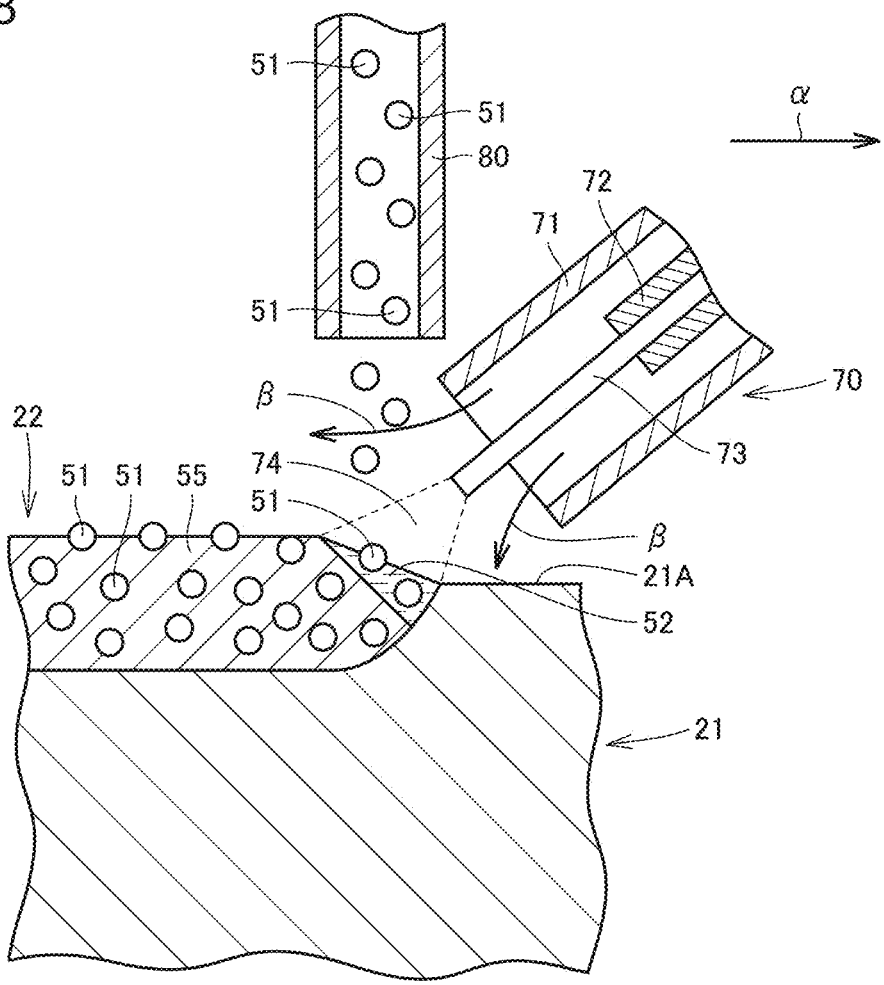
FIG. 8 is a schematic cross-sectional view illustrating a method for forming an overlay.

A method for producing a lug bar 30 in the present embodiment will now be described with reference to FIGS. 5 to 8. FIG. 5 is a flowchart schematically illustrating a method for producing a lug bar. FIGS. 6 and 7 are schematic perspective views illustrating the method for producing a lug bar. FIG. 8 is a schematic cross-sectional view illustrating a method for forming an overlay.

Referring to FIG. 5, in the method for producing a lug bar 30 in the present embodiment, first, a base member preparing step is carried out as a step S11. In this step S11, referring to FIG. 6, a base member 21, which is to be a base 40 of the lug bar 30, is prepared. The base member 21 is made of a first metal forming the base 40. The base member 21 is of a cylindrical shape. The base member 21 includes a pair of end surfaces 21B and a side surface 21A connecting the pair of end surfaces 21B.

Next, an overlay forming step is carried out as a step S12. In this step S12, referring to FIGS. 6 and 7, an overlay 23 is formed to cover a part of the side surface 21A of the base member 21 prepared in the step S11. The overlay 23 is formed over the entire area in the longitudinal direction of the base member 21. The overlay 23 is formed in a part in the circumferential direction of the base member 21. The overlay 23 has a structure in which beads 22, extending in the longitudinal direction of the base member 21, are laid side by side in the circumferential direction, with no gaps therebetween.

The overlay 23 may be formed by, for example, overlaying welding using $CO_2$ arc welding as described below. First, an overlay forming device will be described. Referring to FIG. 8, the overlay forming device includes a welding torch 70 and a hard particles supplying nozzle 80. The welding torch 70 includes a welding nozzle 71 having a hollow cylindrical shape, and a contact tip 72 disposed inside the welding nozzle 71 and connected to a power source (not shown). A welding wire 73, while being in contact with the contact tip 72, is supplied continuously to the tip end side of the welding nozzle 71. For the welding wire, JIS YGW12, for example, can be adopted. A gap between the welding nozzle 71 and the contact tip 72 is a flow path of shielding gas. The shielding gas flowing through the flow path is discharged from the tip end of the welding nozzle 71. The hard particles supplying nozzle 80 has a hollow cylindrical shape. Inside the hard particles supplying nozzle 80, hard particles 51 are supplied, which are discharged from the tip end of the hard particles supplying nozzle 80.

This overlay forming device can be used to form an overlay 23 through the following procedure. With a base member 21 as one electrode and the welding wire 73 as another electrode, voltage is applied across the base member 21 and the welding wire 73. This generates an arc 74 between the welding wire 73 and the base member 21. The arc 74 is shielded from the ambient air by the shielding gas discharged from the tip end of the welding nozzle 71 along the arrows β. For the shielding gas, carbon dioxide, for example, can be adopted. The heat in the arc 74 melts a part of the base member 21 and also melts the tip end of the welding wire 73. The tip end of the welding wire 73 thus molten forms droplets, which transfer to the molten region of the base member 21. This forms a molten pool 52 which is a liquid region where the molten base member 21 and the molten welding wire 73 are mixed together. The hard particles 51 discharged from the hard particles supplying nozzle 80 are supplied to this molten pool 52.

As the welding torch 70 and the hard particles supplying nozzle 80 constituting the overlaying welding device move relatively in the direction shown by the arrow a with respect to the base member 21, the position where the molten pool 52 is formed moves accordingly. The molten pool 52 previously formed solidifies, resulting in a bead 22. The bead 22 includes a matrix 55 formed by solidification of the molten pool 52, and hard particles 51 dispersed in the matrix 55. A plurality of such beads 22 are formed next to one another in the width direction, with no gaps therebetween, to cover a desired region on the side surface 21A of the base member 21, whereby formation of the overlay 23 is completed (see FIG. 7). It should be noted that overlaying welding may be carried out, for example, under the following conditions: welding current of 230 A, welding voltage of 17 V, hard particles feed rate of 110 g/min, and excess bead height of 4 mm. For the welding wire, JIS YGW11 may be adopted. For the hard particles, WC- or $W_2C$-based particles may be adopted.

Referring to FIG. 5, next, a hot forging step is carried out as a step S13. In this step S13, the base member 21 with the overlay 23 formed in the step S12 is hot forged. Referring to FIGS. 7, 1, and 2, the base member 21 with the overlay 23 formed is heated to a temperature enabling hot forging, and then placed in a die having a cavity corresponding to a desired shape of the lug bar 30, for forging. The forging is conducted after the overlay 23 and the base member 21 as a whole have been heated to a temperature enabling hot forging.

With this hot forging, a region of the base member 40 including the overlay edge portion 49 is worked. With the overlay edge portion 49 worked in hot forging, the lug bar 30 is obtained which has the exposed region 42 and the surface of the overlay 50 flush with each other in the overlay edge portion 49. In the overlay edge portion 49, the exposed region 42 and the surface of the overlay 50 form a flush, forged surface corresponding to the region of the surface of the die, used in the hot forging, where the overlay edge portion 49 is worked. In the overlay edge portion 49, the exposed region 42 and the surface of the overlay 50 form a flush surface corresponding to the shape of the die for forging. The overlay edge portion 49 is included in the forged surface.

Referring to FIGS. 8 and 3, as the base member 21 having the overlay 23 formed is hot forged, hard particles 51 that were protruding from a surface of the overlay 23 during formation of the overlay 23 are pressed into the overlay 23. As a result, in the lug bar 30, the hard particles 51 located in the overlay surface region 50B are arranged in contact with the surface 50A of the overlay 50 (see FIG. 3). Among the hard particles 51 located in the overlay surface region 50B, any hard particle 51 having a region exposed from the surface 50A of the overlay 50 has an acute central angle θ (of less than 90°) corresponding to the exposed region. This prevents the hard particle 51 from falling off during the use of the lug bar 30, leading to improved wear resistance of the lug bar 30.

Referring to FIGS. 8 and 4, as the base member 21 having the overlay 23 formed is hot forged, a plurality of protrusions 59 are formed in the overlay 50 in the lug bar 30, in consequence of the hard particles 51 that were located in the vicinity of the interface between the overlay 23 and the base member 21 at the time of formation of the overlay 23. In a protrusion 59, a part of a hard particle 51 is received. The above process simultaneously forms the surface region of the overlay 50 which is excellent in wear resistance with the hard particles 51 arranged in contact with the surface 50A, and the protrusions 59 which prevent the overlay 50 from coming off the base 40.

Referring to FIG. 5, next, a heat treatment step is carried out as a step S14. In this step S14, the lug bar 30 obtained through hot forging in the step S13 is subjected to heat treatment. The heat treatment carried out in the step S14 is, for example, quenching and tempering. This imparts desired hardness and toughness to the base 40 of the lug bar 30. Through the above procedure, the lug bar 30 in the present embodiment is completed.

In the method for producing the lug bar 30 in the above embodiment, when forming the overlay 23 on the base member 21, a surface portion of the base member 21 corresponding to the region of the base member 21 where the overlay 23 is to be formed may be removed in advance (or, an undercut portion may be formed in the base member 21) before formation of the overlay 23. This reduces the deformation amount of the overlay 23 at the time of forging, thereby preventing a defect such as wrinkling of the forged overlay 50.

Figure 9:
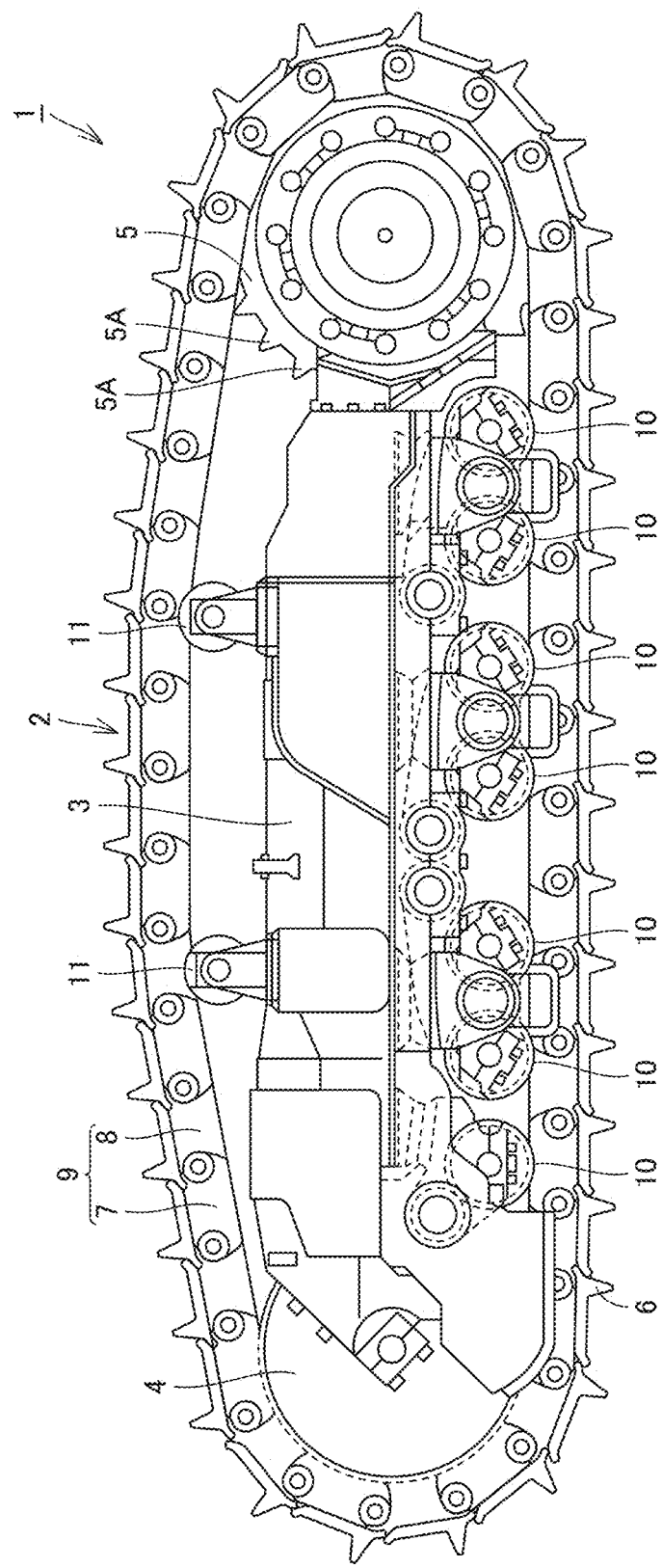
FIG. 9 is a schematic diagram showing the structure of a track travel device.
Figure 10:
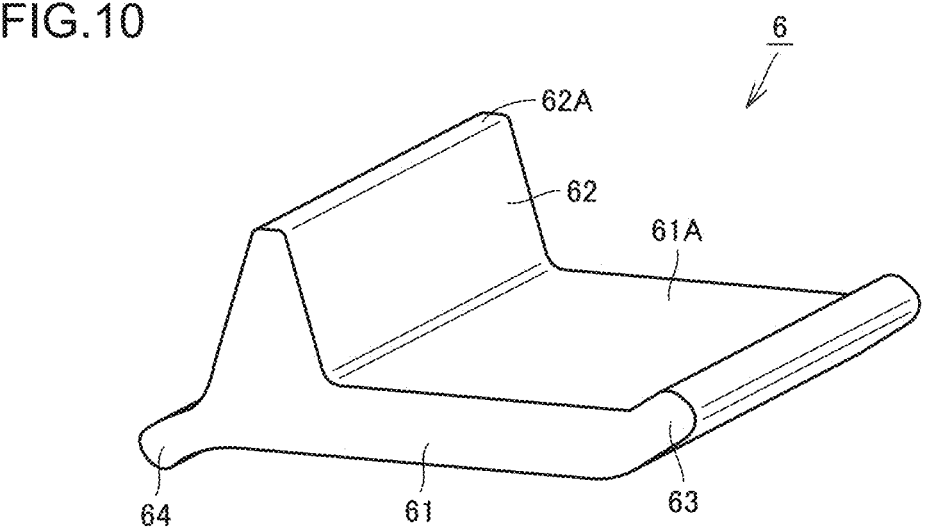
FIG. 10 is a schematic perspective view showing the structure of a track shoe.

A description will now be made about the way of repairing a track shoe using the lug bar 30. FIG. 9 is a schematic diagram showing the structure of a track travel device. FIG. 10 is a schematic perspective view showing the structure of a track shoe.

Referring to FIG. 9, the track travel device 1 in the present embodiment is a travel device for a work machine such as a bulldozer, and includes: a track 2, a track frame 3, an idler tumbler 4, a sprocket wheel 5, a plurality of (here, seven) track rollers 10, and a plurality of (here, two) carrier rollers 11.

The track 2 includes a plurality of track links 9, which are connected endlessly, and track shoes 6, which are fixed to the corresponding track links 9. The track links 9 include outer links 7 and inner links 8. The outer links 7 and the inner links 8 are connected alternately.

The idler tumbler 4, the plurality of track rollers 10, and the plurality of carrier rollers 11 are attached to the track frame 3 in such a manner that they are rotatable about their respective axes. The sprocket wheel 5 is arranged on one end of the track frame 3. A power source such as an engine is connected to the sprocket wheel 5, and the sprocket wheel 5, driven by the power source, rotates about its axis. On an outer peripheral surface of the sprocket wheel 5, a plurality of projections 5A are arranged which project radially outward. The projections 5A mesh with the track 2. The rotation of the sprocket wheel 5 is thus transmitted to the track 2. The track 2, driven by the rotation of the sprocket wheel 5, rotates in a circumferential direction.

The idler tumbler 4 is attached to the other end (opposite to the end where the sprocket wheel 5 is arranged) of the track frame 3. Further, on the track frame 3, in the region sandwiched between the sprocket wheel 5 and the idler tumbler 4, the track rollers 10 and the carrier rollers 11 are attached on the ground contact side and on the side opposite to the ground contact side, respectively. The idler tumbler 4, the track rollers 10, and the carrier rollers 11 have their outer peripheral surfaces coming into contact with the inner peripheral surface of the track 2. As a result, the track 2, driven by the rotation of the sprocket wheel 5, rotates in the circumferential direction while being guided by the idler tumbler 4, the sprocket wheel 5, the track rollers 10, and the carrier rollers 11.

Referring to FIG. 10, the track shoe 6 includes a plate portion 61, which has a plate shape, and a grouser portion 62, which protrudes from the plate portion 61. The grouser portion 62 is formed to protrude outward in the radial direction of the track 2 from an outer peripheral surface 61A of the plate portion 61, which is the main surface corresponding to the outer peripheral side of the track 2. The grouser portion 62 protrudes in a direction intersecting the outer peripheral surface 61A of the plate portion 61. The grouser portion 62 has a tip end surface 62A formed at the tip end in the protruding direction.

On one end of the plate portion 61 in the circumferential direction of the track 2, a first bent portion 63 is formed, which is bent in a direction corresponding to the radially outside of the track 2. On the other end of the plate portion 61 in the circumferential direction of the track 2, a second bent portion 64 is formed, which is bent in a direction corresponding to the radially inside of the track 2. A pair of track shoes 6 adjacent to each other are arranged so that an inner-peripheral-side surface of the first bent portion 63 of one track shoe 6 comes into contact with an outer-peripheral-side surface of the second bent portion 64 of the other track shoe 6.

As the track travel device 1 is operated, the grouser portions 62 of the track shoes 6 are worn out. A method for repairing a track shoe 6 having its grouser portion 62 worn out will now be described.

Figure 11:
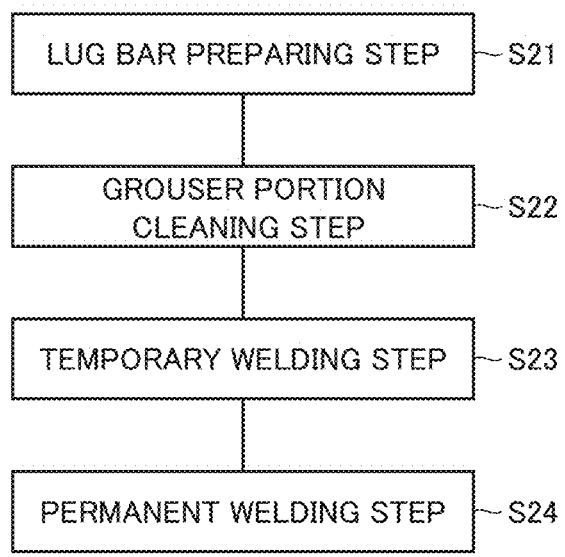
FIG. 11 is a flowchart schematically illustrating a method for repairing a track shoe.
Figure 12:
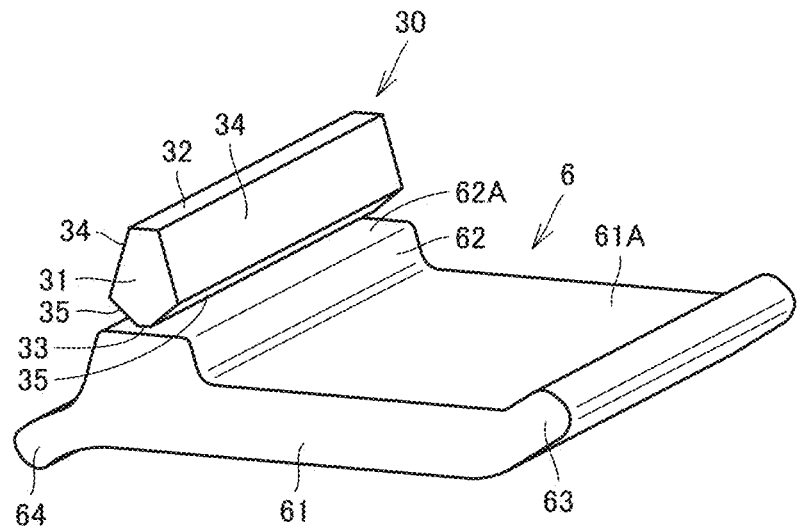
FIG. 12 is a schematic perspective view illustrating the track shoe repairing method.
Figure 13:
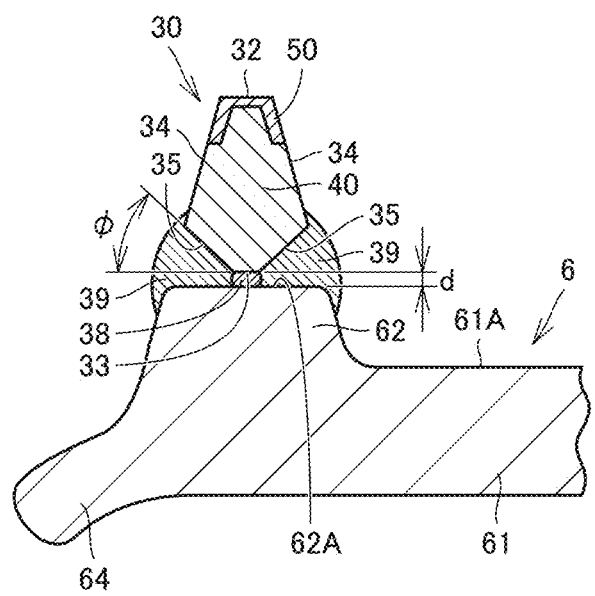
FIG. 13 is a schematic cross-sectional view illustrating the track shoe repairing method.

FIG. 11 is a flowchart schematically illustrating the method for repairing a track shoe. FIG. 12 is a schematic perspective view illustrating the track shoe repairing method. FIG. 13 is a schematic cross-sectional view illustrating the track shoe repairing method.

Referring to FIG. 11, in the method for repairing a track shoe 6 in the present embodiment, a lug bar preparing step is carried out as a step S21. In this step S21, referring to FIG. 12, a lug bar 30 according to the above embodiment is prepared. At this time, a lug bar 30 having an appropriate shape (for example, length) is chosen in accordance with the shape (for example, length) of the grouser portion to which the lug bar is to be joined.

Next, a grouser portion cleaning step is carried out as a step S22. In this step S22, the grouser portion 62 with sand and other materials attached thereto is cleaned. In particular, sand and other materials that have been attached to the tip end surface 62A, to which the lug bar 30 is to be joined in the next step, are removed, so that the tip end surface 62A attains the state appropriate for welding. At this time, from the standpoint of further facilitating the welding, the tip end surface 62A may be worked for the purpose of smoothing or the like.

Next, a temporary welding step is carried out as a step S23. In this step S23, referring to FIGS. 12 and 13, the grouser portion 62 and the lug bar 30 are welded temporarily. Specifically, first, the track shoe 6 and the lug bar 30 are held so that the tip end surface 62A of the grouser portion 62 and the joint surface 33 of the lug bar 30 face each other. The tip end surface 62A of the grouser portion 62 and the joint surface 33 of the lug bar 30 are separated by a root gap d. The root gap d can be set as appropriate in accordance with the shape of the grouser portion 62 and the like. The root gap d can be set to about 1 mm, for example.

The grouser portion 62 and the lug bar 30 are then welded, for example by gas metal arc welding, so that the tip end surface 62A of the grouser portion 62 and the joint surface 33 of the lug bar 30 are connected to each other. A first joint portion 38 is formed between the grouser portion 62 and the lug bar 30.

Referring to FIG. 11, next, a permanent welding step is carried out as a step S24. In this step S24, the grouser portion 62 and the lug bar 30 are welded permanently. Specifically, referring to FIG. 13, welding, for example gas metal arc welding, is conducted so as to fill in the region between the tip end surface 62A of the grouser portion 62 and the first side surfaces 35 of the lug bar 30. The groove angle φ is 45°, for example. A second joint portion 39 is formed between the grouser portion 62 and the lug bar 30. With the grouser portion 62 and the lug bar 30 joined in this manner, the repair of the track shoe 6 is completed.

Referring to FIG. 13, the track shoe 6 thus repaired includes the plate portion 61, having a plate shape, the grouser portion 62, protruding from the outer peripheral surface 61A (the main surface corresponding to the outer peripheral side of the track 2) of the plate portion 61, and the lug bar 30 connected (joined) to the tip end surface 62A of the grouser portion 62. The lug bar 30 joined to the grouser portion 62 is excellent in durability as explained above. Thus, repairing according to the repairing method of the present embodiment can reduce the frequency of repairs and, hence, reduce the downtime of the work machine caused by the repairs.

While the case of using the lug bar of the present invention for repairing a track shoe has been described in the above embodiment, the use of the lug bar of the present invention is not limited thereto. The lug bar of the present invention may be included in a new track shoe from the beginning. In this case, for example, a structure of a track shoe in which a grouser portion protrudes only by a small amount and a lug bar is connected (joined) to the tip end in the protruding direction of the grouser portion can be adopted.

EXAMPLES

A sample assuming the lug bar 30 was produced through a similar procedure as the producing method described in the above embodiment, and the obtained sample was subjected to a test to examine the structure of the overlay and the like (Example). For comparison, a sample was produced in a similar producing method, except that the overlay forming step (step S12) was omitted, and an overlay was formed by overlaying welding after the heat treatment. The obtained sample was subjected to a similar test (Comparative example). The dies used for hot forging in the Example and in the Comparative example were of the same shape.

Figure 14:
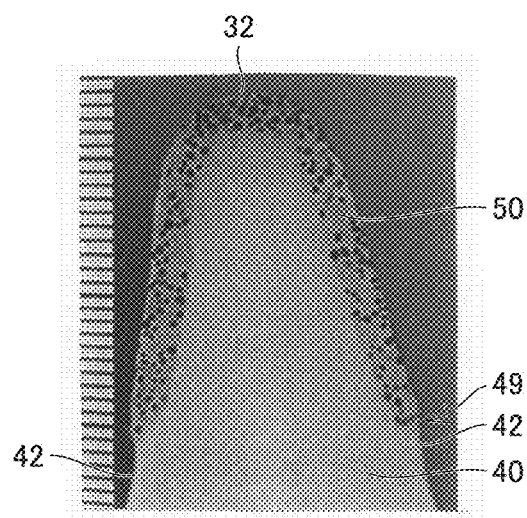
FIG. 14 is a photograph showing a cross section of a sample.

FIG. 14 is a photograph showing a cross section of the sample formed assuming the lug bar 30. Referring to FIG. 14, in the overlay edge portion 49, the exposed region 42 and the surface of the overlay 50 are flush with each other to form a forged surface. It is thus confirmed that the lug bar 30 in the above embodiment can be produced by the producing method in the above embodiment. No cracking is seen between the overlay 50 and the base 40. No defect resulting from hot forging performed after the formation of the overlay is observed.

FIG. 15 is an optical micrograph obtained by imaging a surface and its vicinity of the overlay of the Example. FIG. 16 is an optical micrograph obtained by imaging a surface and its vicinity of the overlay of the Comparative example. As shown in FIG. 16, in the overlay of the Comparative example, which has been formed by overlaying welding and not subjected to forging thereafter, hard particles 51 protrude noticeably from the surface 50A of the overlay. Referring to FIG. 15, in the overlay of the Example, which has been formed and then worked by forging, hard particles 51 located in the surface region are arranged side by side while being embedded in the overlay (matrix 55). The hard particles 51 are aligned in contact with the surface 50A of the overlay 50. A hard particle 51 having a region exposed from the surface 50A of the overlay 50 has an acute central angle θ (of less than 90°) corresponding to the exposed region. This is presumably because, during the process in which the overlay is worked by forging, the hard particles 51 that were protruding from the surface 50A of the overlay are pressed into the matrix 55 having relatively low hardness.

Figure 18:
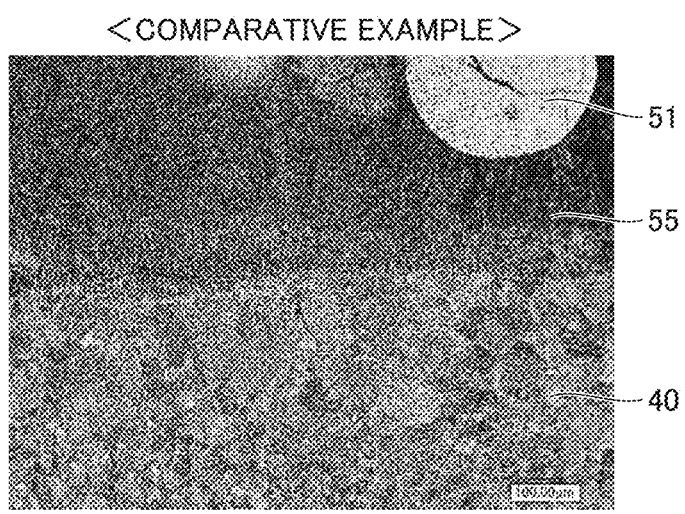
FIG. 18 is an optical micrograph showing an interface between an overlay and a base and its vicinity (Comparative example).

FIG. 17 is an optical micrograph obtained by imaging an interface between the overlay and the base and its vicinity of the Example. FIG. 18 is an optical micrograph obtained by imaging an interface between the overlay and the base and its vicinity of the Comparative example. As shown in FIG. 18, in the Comparative example where the overlay has been formed by overlaying welding and not subjected to forging thereafter, the interface between the overlay (matrix 55) and the base 40 is flat. Referring to FIG. 17, in the Example where the overlay has been formed and then worked by forging, in the region including the interface between the overlay (matrix 55) and the base 40, a plurality of protrusions 59 are formed with the overlay (matrix 55) protruding toward the base 40. In each protrusion 59, a part of a corresponding hard particle 51 is received. It is considered that the protrusions 59 have been formed while the overlay was worked by forging, in consequence of the hard particles 51 present in the vicinity of the interface with the base member. A hard particle 51 that has contributed to the formation of a protrusion 59 has at least a part received in the protrusion 59.

It should be understood that the embodiment and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The lug bar and its producing method according to the present invention may be applicable particularly advantageously to a lug bar having an overlay and to its producing method.

DESCRIPTION OF REFERENCE NUMERALS

1: track travel device; 2: track; 3: track frame; 4: idler tumbler; 5: sprocket wheel; 5A: projection; 6: track shoe; 7: outer link; 8: inner link; 9: track link; 10: track roller; 11: carrier roller; 21: base member; 21A: side surface; 21B: end surface; 22: bead; 23: overlay; 30: lug bar; 31: end surface; 32: tip end surface; 33: joint surface; 34: second side surface; 35: first side surface; 38: first joint portion; 39: second joint portion; 40: base; 41: covered region; 42: exposed region; 49: overlay edge portion; 50: overlay; 50A: surface; 50B: overlay surface region; 51: hard particle; 52: molten pool; 55: matrix; 59: protrusion; 61: plate portion; 61A: outer peripheral surface; 62: grouser portion; 62A: tip end surface; 63: first bent portion; 64: second bent portion; 70: welding torch; 71: welding nozzle; 72: contact tip; 73: welding wire; 74: arc; and 80: hard particles supplying nozzle.

The invention claimed is:

1. A lug bar to be joined to a grouser portion of a track shoe constituting a track, the lug bar comprising:

a base having a bar shape and being made of a first metal;

an overlay extending along a longitudinal direction of the base and covering a covered region of the base, the covered region being a portion of an outer peripheral surface of the base, the overlay including (i) a matrix made of a second metal, and (ii) a plurality of hard particles dispersed in the matrix, the plurality of hard particles having a greater hardness than a hardness of the second metal; and an overlay edge portion corresponding to a boundary between the covered region and an exposed region other than the covered region of the surface of the base, the exposed region and a surface of the overlay being flush with each other to form a forged surface in the overlay edge portion, the overlay and the overlay edge portion forming a "U" shape on a first side of the base and extending along the longitudinal direction of the base.

2. The lug bar according to claim 1, wherein the plurality of hard particles are located in an overlay surface region and are adjacent to each other in the overlay, the overlay surface region being a region within an average particle diameter of the plurality of hard particles from the surface of the overlay.

3. The lug bar according to claim 2, wherein the plurality of hard particles embedded in the overlay surface region are arranged in contact with the surface of the overlay.

4. The lug bar according to claim 2, wherein any hard particle of the plurality of hard particles having a region exposed from the surface of the overlay has an acute central angle corresponding to the region exposed from the surface of the overlay.

5. The lug bar according to claim 1, wherein
in a region including an interface between the overlay and the base, the overlay includes a plurality of protrusions protruding toward the base, and
each protrusion of the plurality of protrusions has at least a part of a hard particle received therein.

6. The lug bar according to claim 2, wherein
in a region including an interface between the overlay and the base, the overlay includes a plurality of protrusions protruding toward the base, and
each protrusion of the plurality of protrusions has at least a part of a hard particle received therein.

7. The lug bar according to claim 3, wherein
in a region including an interface between the overlay and the base, the overlay includes a plurality of protrusions protruding toward the base, and
each protrusion of the plurality of protrusions has at least a part of a hard particle received therein.

8. The lug bar according to claim 4, wherein
in a region including an interface between the overlay and the base, the overlay includes a plurality of protrusions protruding toward the base, and each protrusion of the plurality of protrusions has at least a part of a hard particle received therein.

9. A track shoe including the lug bar according to claim 1.

10. A method for producing a lug bar to be joined to a grouser portion of a track shoe constituting a track, the method comprising the steps of:
preparing a base member having a bar shape and made of a first metal;
forming an overlay including a matrix made of a second metal and a plurality of hard particles dispersed in the matrix, the plurality of hard particles having a greater hardness than a hardness of the second metal, the overlay extending along a longitudinal direction of the base member and covering a covered region as a part of a surface of the base member; and
hot forging the base member with the formed overlay including the plurality of hard particles such that an overlay edge portion corresponding to a boundary between the covered region and an exposed region other than the covered region is worked, the hot forging of the base member with the formed overlay resulting in the overlay and the overlay edge portion forming a "U" shape on a first side of the base member and extending along the longitudinal direction of the base member.

11. The lug bar producing method according to claim 10, wherein the step of hot forging the base member with the formed overlay includes heating the overlay and the base member together.

* * * * *